United States Patent
Son et al.

(10) Patent No.: US 11,650,855 B2
(45) Date of Patent: May 16, 2023

(54) CLOUD COMPUTING-BASED SIMULATION APPARATUS AND METHOD FOR OPERATING THE SAME

(71) Applicant: ELECTRONICS AND TELECOMMUNICATIONS RESEARCH INSTITUTE, Daejeon (KR)

(72) Inventors: Seok-Ho Son, Daejeon (KR); Dong-Jae Kang, Daejeon (KR); Byoung-Seob Kim, Sejong (KR); Seung-Jo Bae, Daejeon (KR); Byeong-Thaek Oh, Sejong (KR); Kure-Chel Lee, Daejeon (KR); Young-Woo Jung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 402 days.

(21) Appl. No.: 16/789,234

(22) Filed: Feb. 12, 2020

(65) Prior Publication Data
US 2020/0257570 A1 Aug. 13, 2020

(30) Foreign Application Priority Data
Feb. 13, 2019 (KR) .................. 10-2019-0016906

(51) Int. Cl.
G06F 9/50 (2006.01)
G06F 30/20 (2020.01)
G06F 111/02 (2020.01)

(52) U.S. Cl.
CPC ............ *G06F 9/5077* (2013.01); *G06F 30/20* (2020.01); *G06F 2111/02* (2020.01); *G06F 2209/508* (2013.01)

(58) Field of Classification Search
CPC .... G06F 9/5077; G06F 30/20; G06F 2111/02; G06F 2209/508
(Continued)

(56) References Cited

U.S. PATENT DOCUMENTS 8,819,605 B1 * 8/2014 Barker .................. G06F 30/398
716/112
10,402,300 B2 9/2019 Enright
(Continued)

FOREIGN PATENT DOCUMENTS

JP 2018-5896 A 1/2018
JP 2018-32392 A 3/2018
(Continued)

OTHER PUBLICATIONS

Pace_2018 (A Data-Driven Approach to Dynamically Adjust Resource Allocation for Computer Clusters, Jul. 1, 2018) (Year: 2018).*
(Continued)

*Primary Examiner* — Brian S Cook (57) ABSTRACT

Disclosed herein are a cloud computing-based simulation apparatus and a method for operating the simulation apparatus. The method for operating a cloud computing-based simulation apparatus includes profiling a simulation in consideration of a simulation model and setup items that are requested by a user, when there is a history corresponding to results of the profiled simulation, calculating a resource configuration probability distribution for the simulation using the history, replicating the simulation environment to multiple simulation environments by selecting resource configurations in N simulation environments depending on the resource configuration probability distribution, where N is an integer of 2 or more, and simultaneously executing simulations in the multiple simulation environments.

13 Claims, 9 Drawing Sheets

(58) Field of Classification Search
USPC .......................................................... 718/104
See application file for complete search history.

(56) References Cited

U.S. PATENT DOCUMENTS

| | | | |
|---|---|---|---|
| 11,327,797 B2* | 5/2022 | Chan | G06F 3/0629 |
| 2017/0031720 A1* | 2/2017 | Sarkar | G06F 9/5055 |
| 2018/0046561 A1 | 2/2018 | Enright | |
| 2018/0060456 A1 | 3/2018 | Phatak et al. | |
| 2018/0212843 A1 | 7/2018 | Park et al. | |
| 2018/0367631 A1 | 12/2018 | Son et al. | |

FOREIGN PATENT DOCUMENTS

| | | |
|---|---|---|
| KR | 10-2013-0134569 A | 12/2013 |
| KR | 10-1474872 B1 | 12/2014 |
| KR | 20150092944 A | 8/2015 |
| KR | 10-1695013 B1 | 1/2017 |
| KR | 20170071750 A | 6/2017 |

OTHER PUBLICATIONS

Zhou_2019 (Probability Distribution based Resource Management for Transient Resources, 2019 Seventh International Conference on Advanced Cloud and Big Data (CBD), 2019) (Year: 2019).*
Peter Wittek et al., "Scalable Agent-based Modelling with Cloud HPC Resources for Social Simulations", 2012 IEEE 4th International Conference on Cloud Computing Technology and Science, Dec. 2012, pp. 355-362.

* cited by examiner

FIG. 1

<PRIOR ART>

| RESOURCE CONFIGURATION NUMBER | 1 | 2 | 3 | 4 | 5 | ... | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|
| OPTIMAL RESOURCE CONFIGURATION PROBABILITY | 0 | 0 | 0 | 0 | 0 | ... | 0 | 0 | 5% | 1% | 3% | 10% | 75% | 10% | 3% | 1% | 5% | 0 | 0 | 0 |
| REPLICATION EXECUTION NUMBER | | | | | | ... | | | | 6 | 4 | 2 | 1 | 3 | 5 | 7 | | | | |

FIG. 6

| RESOURCE CONFIGURATION NUMBER | 1 | 2 | 3 | 4 | 5 | ... | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|
| OPTIMAL RESOURCE CONFIGURATION PROBABILITY | 3% | 3% | 3% | 3% | 3% | ... | 3% | 3% | 3% | 3% | 3% | 3% | 3% | 3% | 3% | 3% | 3% | 3% | 3% | 3% |
| REPLICATION EXECUTION NUMBER | 1 | | | | 2 | ... | | | | 5 | | | | | 6 | | | | | 7 |

FIG. 7

RESOURCE CONFIGURATION SETUP ITEM 1
(NUMBER OF VIRTUAL NODES
CONSTITUTING CLUSTER)

| 1 | 2 | 3 | 4 | 5 | 6 | ... | 32 | ... | 64 |
|---|---|---|---|---|---|---|---|---|---|

FIG. 8

RESOURCE CONFIGURATION SETUP ITEM 2
(COMPUTING RESOURCE SPECIFICATION)

| y.1 |     |     |     | ... |     | x.y |
|-----|-----|-----|-----|-----|-----|-----|
| ⋮   |     |     |     |     |     |     |
|     |     |     |     | ... |     | ... |
| 3.1 |     |     |     |     |     |     |
| 2.1 |     |     |     |     |     |     |
| 1.1 | 1.2 | 1.3 |     | ... |     | 1.x |

RESOURCE CONFIGURATION SETUP ITEM 1
(NUMBER OF VIRTUAL NODES
CONSTITUTING CLUSTER)

CLOUD COMPUTING-BASED SIMULATION APPARATUS AND METHOD FOR OPERATING THE SAME

CROSS REFERENCE TO RELATED APPLICATION

This application claims the benefit of Korean Patent Application No. 10-2019-0016906, filed Feb. 13, 2019, which is hereby incorporated by reference in its entirety into this application.

BACKGROUND OF THE INVENTION

1. Technical Field

The present invention relates to a cloud computing-based simulation apparatus and a method for operating the simulation apparatus.

2. Description of the Related Art

Generally, a simulation operates on a single computer or on a cluster composed of multiple computers. Cloud computing may be logically configured by virtualizing physical computing resources, and may provide virtual nodes (virtual computing resources, virtual machines, virtual servers, containers, etc.) to users. Therefore, in a cloud computing-based simulation, a simulation may function on a virtual node (e.g., a virtual computing resource, a virtual machine, a virtual server, a container, etc.) in a cloud or on a virtual cluster composed of virtual nodes. When a simulation is performed through a virtual node for cloud computing, an execution environment for simulation may be configured fast. Also, when computing requirements for a simulation are increased, additional cloud resources may be utilized in an on-demand manner.

In a conventional simulation execution scheme using a cloud, a user arbitrarily selects the configuration of computing resources for a simulation and then executes the simulation. Such a simulation is a task that requires a considerably long time for execution. When the configuration of designated resources is not suitable, the simulation execution speed may be remarkably decreased. Further, when the performance, capacity, type, etc. of resources required by the simulation are erroneously configured, errors may occur before completion of a simulation that is executed for a long period of time. In this case, a simulation user may waste his or her time as well as costs of computing resources.

PRIOR ART DOCUMENTS

Patent Documents (Patent Document 1) U.S. Patent Application Publication No. US 2018-0060456, Date of Publication: Mar. 1, 2018, Title: Simulation Including Multiple Simulators (Patent Document 2) U.S. Patent Application Publication No. US 2018-0046561, Date of Publication: Feb. 15, 2018, Title: System, Controller, Method and Program for Executing Simulation Jobs

SUMMARY OF THE INVENTION

Accordingly, the present invention has been made keeping in mind the above problems occurring in the prior art, and an object of the present invention is to cloud provide a cloud computing-based simulation apparatus and a method for operating the simulation apparatus, which dynamically configure optimal cloud computing resources suitable for various simulations, thus improving simulation speed and preventing simulation failure attributable to exhaustion of computing resources and the configuration of computing resources.

In accordance with an aspect of the present invention to accomplish the above object, there is provided a method for operating a cloud computing-based simulation apparatus, including profiling a simulation in consideration of a simulation model and setup items that are requested by a user, when there is a history corresponding to results of the profiled simulation, calculating a resource configuration probability distribution for the simulation using the history, replicating the simulation environment to multiple simulation environments by selecting resource configurations in N simulation environments depending on the resource configuration probability distribution, where N is an integer of 2 or more, and simultaneously executing simulations in the multiple simulation environments.

In an embodiment, calculating the resource configuration probability distribution may include, when there is the history, calculating a moving average of multiple sections of the history, calculating a moving variance of the multiple sections, and generating a resource configuration probability table by calculating a normal probability distribution based on the moving average and the moving variance.

In an embodiment, the method may further include, when there is no history corresponding to the profiled simulation results, uniformly calculating the resource configuration probability distribution based on the user's settings.

In an embodiment, N may be set to any one of a value designated by a system, a value designated by the user, and a value corresponding to virtual resource usage budget of the user.

In an embodiment, simultaneously executing the simulations may include checking resource configurations in individual simulation environments and allocating virtual nodes to the resource configurations, configuring a simulation cluster from the allocated virtual nodes, and executing the corresponding simulation on the configured simulation cluster.

In an embodiment, the method may further include monitoring a status of the simulations executed in the multiple simulation environments.

In an embodiment, the method may further include, when the simulation is completed in any one of the multiple simulation environments as a result of the monitoring, storing a completion time of the simulation, and updating results of execution of the simulation and information about a resource configuration and setup in the corresponding simulation environment in the history.

In an embodiment, the method may further include, when the simulation is completed in any one of the multiple simulation environments as a result of the monitoring, terminating execution of simulations in remaining simulation environments.

In an embodiment, the method may further include, when all simulations in the multiple simulation environments have failed as a result of the monitoring, providing notification of simulation failure to the user.

In accordance with another aspect of the present invention to accomplish the above object, there is provided a cloud computing-based simulation apparatus, including at least one processor, and a memory for storing at least one instruction executed by the at least one processor, the at least one instruction being configured to profile a simulation in consideration of a simulation model and setup items that are requested by a user, when there is a history corresponding to results of the profiled simulation, calculate a resource configuration probability distribution for the simulation using the history, replicate the simulation environment to multiple simulation environments by selecting resource configurations in N simulation environments depending on the resource configuration probability distribution, where N is an integer of 2 or more, and simultaneously execute simulations in the multiple simulation environments.

In an embodiment, the multiple simulation environments may be configured using different numbers of virtual nodes.

In an embodiment, when a simulation is completed in any one of the multiple simulation environments, simulations in remaining simulation environments may be terminated, and cloud resources used in the remaining simulation environments may be released.

In an embodiment, a status of the simulations executed in the multiple simulation environments may be monitored using a push method or a polling method.

In an embodiment, results of multiple simulations may be aggregated and stored through monitoring of the status of the simulations.

BRIEF DESCRIPTION OF THE DRAWINGS

The accompanying drawings are provided to aid in understanding of the present embodiments, and the embodiments are provided together with the detailed descriptions thereof. However, the technical features of the present embodiments are not limited to what is specifically shown in the drawings, and the features disclosed in respective drawings may be combined to configure new embodiments.

DESCRIPTION OF THE PREFERRED EMBODIMENTS

Embodiments of the present invention are described with reference to the accompanying drawings in order to describe the present invention in detail so that those having ordinary knowledge in the technical field to which the present invention pertains can easily practice the present invention.

Reference will now be made in detail to various embodiments of the present invention, specific examples of which are illustrated in the accompanying drawings and described below, since the embodiments of the present invention can be variously modified in many different forms. However, this is not intended to limit the present invention to particular modes of practice, and it is to be appreciated that all changes, equivalents, and substitutes that do not depart from the spirit and technical scope of the present invention are encompassed in the present invention. It is to be understood that, although the terms "first" and "second" may be used herein to describe various components, these components are not intended to be limited by these terms. These terms are only used to distinguish one component from another component. For instance, a first component discussed below could be termed a second component without departing from the teachings of the present invention. Similarly, a second component could also be termed a first component. It will be understood that when a component is referred to as being "coupled" or "connected" to another component, it can be directly coupled or connected to the other component, or intervening components may be present therebetween. In contrast, it should be understood that when a component is referred to as being "directly coupled" or "directly connected" to another component, there are no intervening components present.

The terminology used herein is for the purpose of describing particular embodiments only and is not intended to be limiting. In the present invention, the singular forms are intended to include the plural forms as well, unless the context clearly indicates otherwise.

It should be further understood that the terms "comprise", "include", and "have", when used in this specification, specify the presence of stated features, integers, steps, operations, elements, components, and/or combinations thereof, but do not preclude the presence or addition of one or more other features, integers, steps, operations, elements, components, and/or combinations thereof. Unless differently defined, all terms used here including technical or scientific terms have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitely defined in the present specification.

In a simulation using a typical cloud, a simulation user arbitrarily designates a computing resource configuration required for the simulation (e.g., performance, number, resource types, various types of settings, etc.).

Figure 1:
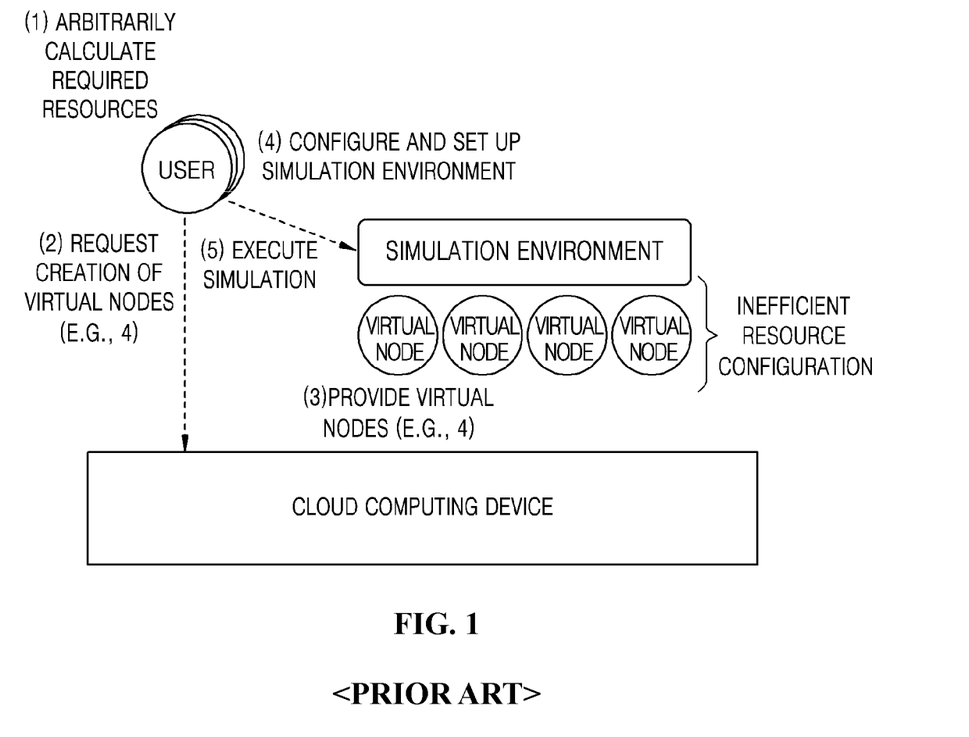
FIG. 1 is a diagram illustrating a method for configuring a simulation environment and executing a simulation using a typical cloud.

FIG. 1 is a diagram illustrating a method for configuring a simulation environment using a typical cloud and executing a simulation. Referring to FIG. 1, a user arbitrarily calculates the type and scale of resources required for the simulation and requests a cloud computing device to create required resources. When the cloud computing device provides virtual node computing resources to the user, the user may configure and set up a simulation environment, execute a simulation, and finally receive simulation results.

However, since the simulation users are not specialists with regard to methods for configuring and utilizing computing resources, they have difficulty in configuring and setting up computing resources suitably for various types of simulations. When computing resources are not suitably configured, a decrease in simulation speed or simulation failure attributable to exhaustion of resources may be caused.

Therefore, there is a need to support the configuration of computing resources to enable simulation users to dynamically configure optimal cloud computing resources suitable for various types of simulations. When optimal cloud computing resources suitable for various types of simulations are dynamically configured, the decrease in simulation speed or simulation failure may be reduced.

A cloud computing-based simulation apparatus and a method for operating the simulation apparatus according to an embodiment of the present invention may dynamically configure optimal cloud computing resources suitable for various types of simulations, improve the simulation speed, and prevent the occurrence of simulation failure attributable to exhaustion of computing resources and the configuration of computing resources.

Figure 2:
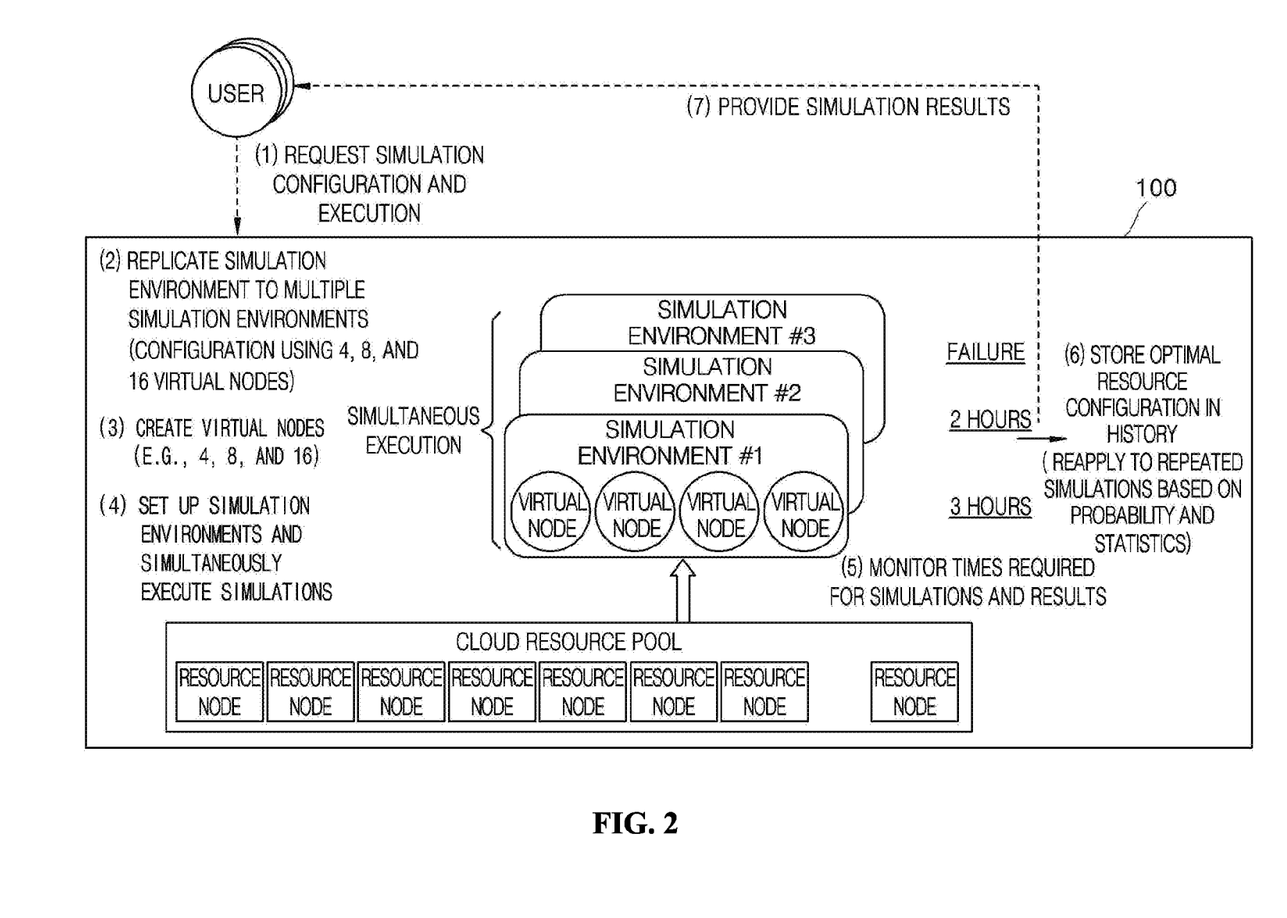
FIG. 2 is a diagram exemplarily illustrating a cloud computing-based simulation apparatus according to an embodiment of the present invention.

FIG. 2 is a diagram exemplarily illustrating a cloud computing-based simulation apparatus 100 according to an embodiment of the present invention.

Since a user does not know a suitable cloud resource configuration method, the speed of simulation may be decreased when a simulation is performed based on the configuration of resources arbitrarily set by the user (e.g., the number of virtual nodes that constitute a virtual cluster, the memory size of the virtual nodes, etc.). Also, when the amount of resources is insufficient, a simulation may not be normally operated. For example, when the amount of memory in virtual resources is insufficient, a problem may arise in that a simulation is interrupted while being executed.

In an embodiment, the simulation apparatus 100 may also replicate one simulation requested by the user to multiple (i.e., N) simulation environments depending on resource configuration and setup, and may simultaneously execute the multiple simulations.

In an embodiment, among N simulations executed in N simulation environments, the results of the simulation in the simulation environment that provides the highest speed (i.e., that completes the simulation the earliest) may be returned to the user.

In an embodiment, simulation environments having other configurations started simultaneously with the returning of the simulation results may be rapidly terminated, and the resources therefor may be released, so as to improve the efficiency of use of resources and reduce costs.

In an embodiment, a simulation environment in which simulation failure or an error occurs in the middle of execution during may be promptly terminated, and resources may be released.

In an embodiment, the configuration and setup of virtual resources in the simulation environment that provides the highest speed (i.e. having the earliest simulation completion time), among N simulations, may be regarded as the optimal selection.

As described above, replication of one simulation environment to N simulation environments and simultaneous execution of simulations may be very effective for improvement of simulation speed and prevention of simulation failure. However, since this method increases the use of virtual resources, there occurs a trade-off between cost and speed. The simulation apparatus 100 may limit the consumption of resources (i.e., limit expenses) while improving simulation speed.

Meanwhile, various heterogeneous simulations may be developed depending on simulation models. Since heterogeneous simulations exhibit workloads in different patterns, the scales and types of resources to be consumed by the simulations may differ from each other. Further, since even simulations that use the same model exhibit workloads of different patterns depending on various parameters used in simulations, the scales and types of resources to be consumed may differ from each other.

The simulation apparatus 100 according to an embodiment of the present invention may profile various heterogeneous simulations and incorporate components of the simulation environment that were successful in the past into the configuration and execution of a new simulation environment based on statistics and probability when users repeatedly configure and execute various heterogeneous simulations.

In an embodiment, when a single simulation environment is replicated to N simulation environments, N simulations are simultaneously executed, and a simulation environment having the most suitable resource configuration is normally terminated, the simulation apparatus 100 may store the corresponding information in a history.

In an embodiment, the simulation apparatus 100 may profile the virtual resource configuration information and setup of the corresponding simulation environment, and may generate the probability distribution of an optimal resource configuration through statistics and probability based on the history information.

Thereafter, if there is a history of profiled simulation results when the user repeats the configuration of the simulation environment and execution of simulations, the simulation apparatus 100 simultaneously replicates simulation environments using the probability distribution of the optimal resource configuration of the corresponding simulation.

In an embodiment, the simulation apparatus 100 may replicate the simulation environment using configurations in a section during which the probability that the current resource configuration will be the configuration of optimal resources (the probability that the simulation will be successfully and promptly performed) is high by utilizing the probability distribution of the optimal resource configuration. Due to this, the simulation apparatus 100 may stochastically improve the simulation speed, and may limit the number of simulation environments resulting from replication, thus improving the simulation performance and minimizing an increase in cost.

Further, the cloud computing-based simulation apparatus 100 may include at least one processor, and memory for storing at least one instruction that is executed by the at least one processor. The at least one instruction may configure the following cloud computing-based simulation block diagram.

Figure 3:
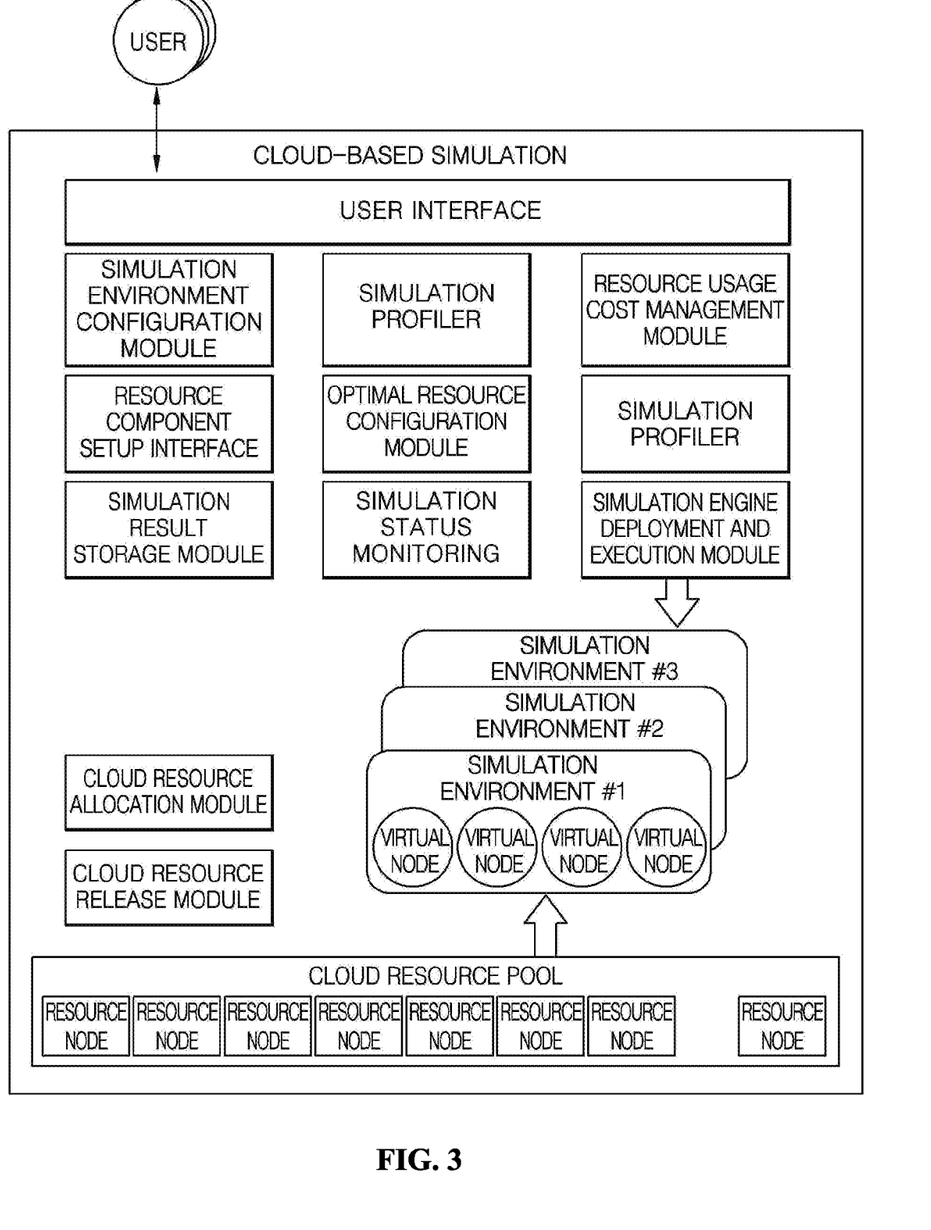
FIG. 3 is a block diagram illustrating cloud computing-based simulation according to an embodiment of the present invention.

FIG. 3 is a block diagram illustrating a cloud computing-based simulation according to an embodiment of the present invention.

A user interface may perform functions so that a user configures and executes a simulation and checks the results of the simulation through the simulation apparatus 100.

A simulation environment configuration module may set up a simulation so that a simulation can be executed in accordance with the simulation configuration and setup requested by a user.

A simulation profiler may classify identical or similar simulations depending on various simulation models and the setup of individual simulations. In accordance with simulation profiles, optimal virtual resource configuration and setup may be designated.

A resource component setup interface denotes an interface and a function allowing a supervisor to plug a principal resource component in a simulation. Here, the resource component may include the number of virtual nodes that constitute a simulation cluster, the performance of resources (CPU, memory, network bandwidth, etc.), information about whether each virtual node supports a specific function, etc. When adding a resource component, the supervisor may also include an execution method in the simulation so that the configuration and setup of resources are actually changeable depending on the corresponding resource components. For example, when it is desired to add information about whether to support a Graphics Processing Unit (GPU) as a virtual resource component, the supervisor may allow a function of designating a resource that supports a GPU to be included in the simulation when requesting the creation of virtual resources from a cloud resource pool.

A resource usage cost management module may manage costs spent in virtual resources used when replicating a simulation to multiple simulations.

An optimal resource configuration module may store the corresponding information in a history when one simulation environment is replicated to N simulation environments, N simulations are simultaneously executed, and a simulation is normally terminated (completed) in a simulation environment having the most suitable resource configuration.

In an embodiment, the simulation apparatus 100 may profile virtual resource configuration information and setup of the corresponding simulation environment based on the history information of previously executed simulations, and may generate the probability distribution of the optimal resource configuration through statistics and probability based on the history information.

A simulation replication module may generate N simulation environments having various resource configurations from one simulation environment, and may schedule N simulations to be simultaneously executed.

A cloud resource allocation module may move virtual resources that are currently operating in an existing resource node through migration or terminate the virtual resources so that the performance of virtual resource configuration of a cloud is correctly evaluated.

The cloud resource allocation module may allocate virtual nodes for a simulation to the resource nodes of a cloud using resource configuration and setup designated by the simulation replication module. The cloud resource nodes may also request and use cloud resources present outside of the system according to the circumstances.

A simulation engine deployment and execution module may automatically construct a simulation engine and a simulation environment in created virtual resources of the cloud and in a cluster composed of the virtual resources, and may execute a simulation depending on the simulation setup requested by the user.

In an embodiment, the simulation apparatus 100 may execute a simulation by applying setup related to resources based on the policy of the simulation replication module.

Simulation status monitoring may be a function of monitoring status events, such as the start, success, error, failure, etc. of a simulation. Here, monitoring may be implemented using a polling method or a push method.

A simulation result storage module may aggregate the results of multiple simulations (start, success, error, failure, etc.) through simulation status monitoring, and may store the aggregated results.

A cloud resource release module may immediately terminate virtual nodes in a simulation environment in which a simulation has failed, and may release resources allocated to the virtual nodes. The cloud resource release module may release all of used cloud resources when all of multiple simulations are terminated.

Figure 4:
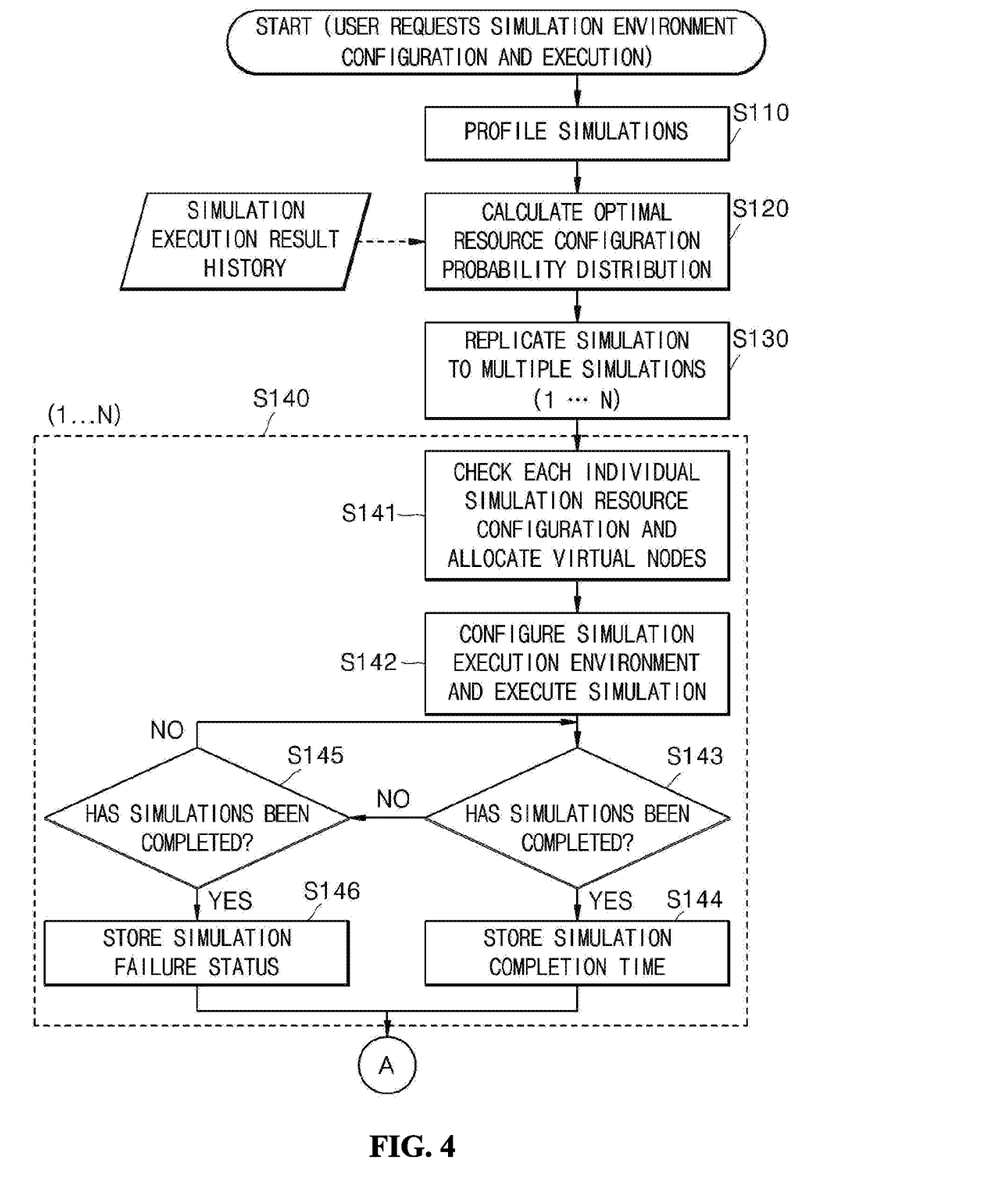
FIGS. 4 and 5 are flow diagrams exemplarily illustrating a process for replicating a simulation environment configuration and optimizing a resource configuration.
Figure 5:
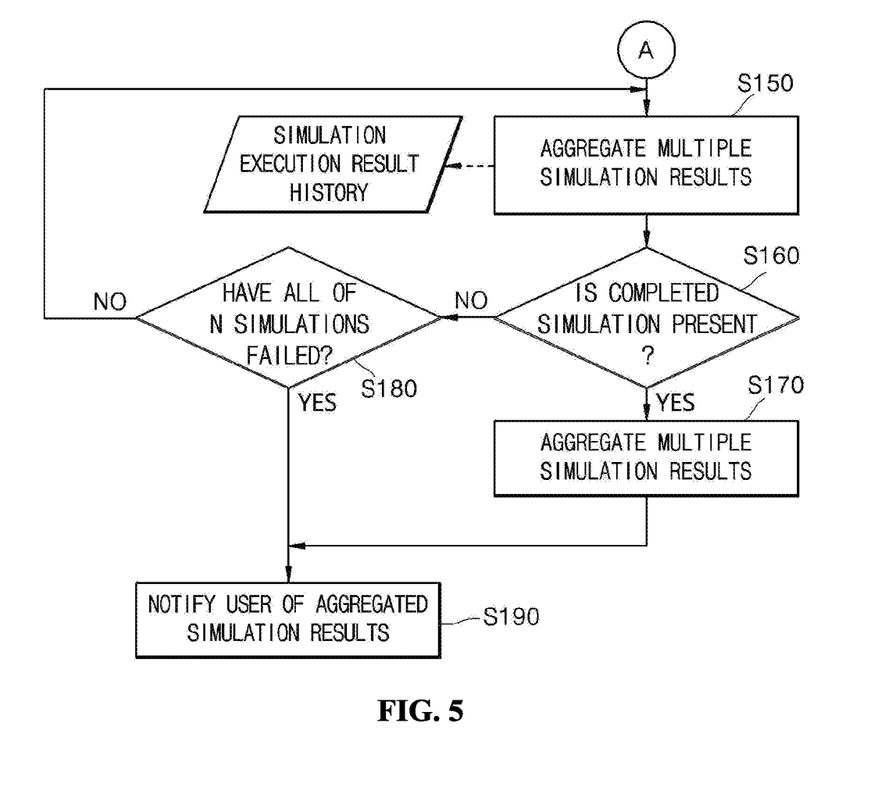

FIGS. 4 and 5 are flow diagrams exemplarily illustrating a process for replicating a simulation environment configuration and optimizing resource configurations. Referring to FIGS. 4 and 5, the process for replicating a simulation environment configuration and optimizing resource configurations may be performed as follows.

When a user requests the configuration of simulation environments and execution of simulations, the simulation apparatus 100 may profile the simulations in consideration of models and settings of the simulations requested by the user, and may generate simulation groups depending on the degree of identicalness or similarity between the simulations at step S110.

Thereafter, the simulation apparatus 100 may calculate the probability distribution of an optimal resource configuration by utilizing a history of the results of performing previous simulations (for each simulation type, information about an optimal resource configuration and setup that provided the fastest performance) at step S120.

Figure 6:
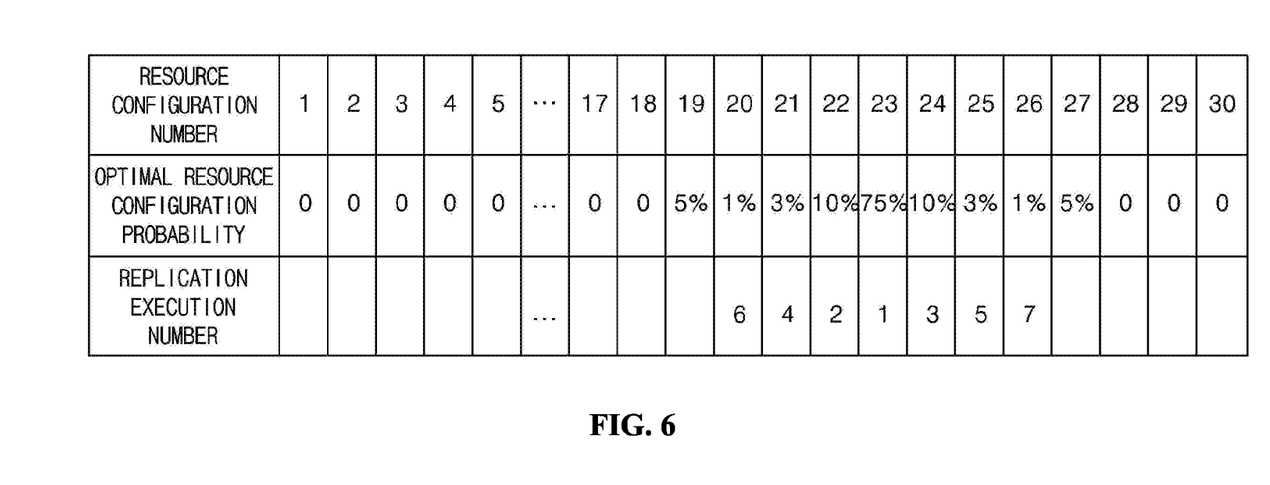
FIG. 6 is a diagram exemplarily illustrating a probability distribution when there is a simulation history.

FIG. 6 is a diagram exemplarily illustrating a probability distribution when there is a simulation history. Referring to FIG. 6, when there is a history of the corresponding simulation, the simulation apparatus 100 may calculate a moving average (MA) for section m of the history using Equation (1). Also, the simulation apparatus 100 may calculate a moving variance $MSTD^2$ for the section m of the history using Equation (2). In this way, the simulation apparatus 100 may generate an optimal resource configuration probability table by calculating a normal probability distribution conforming to $N(MA, MSTD^2)$.

The following Equation (1) denotes a formula for calculating the moving average (MA).

$$MA = \frac{1}{m} \cdot \sum_{i=n-m+1}^{n} V_i \qquad (1)$$

The following Equation (2) denotes a formula for calculating the moving variance $MSTD^2$.

$$MSTD^2 = \frac{1}{m} \cdot \sum_{i=n-m+1}^{n} (MA - V_i)^2 \qquad (2)$$

Figure 7:
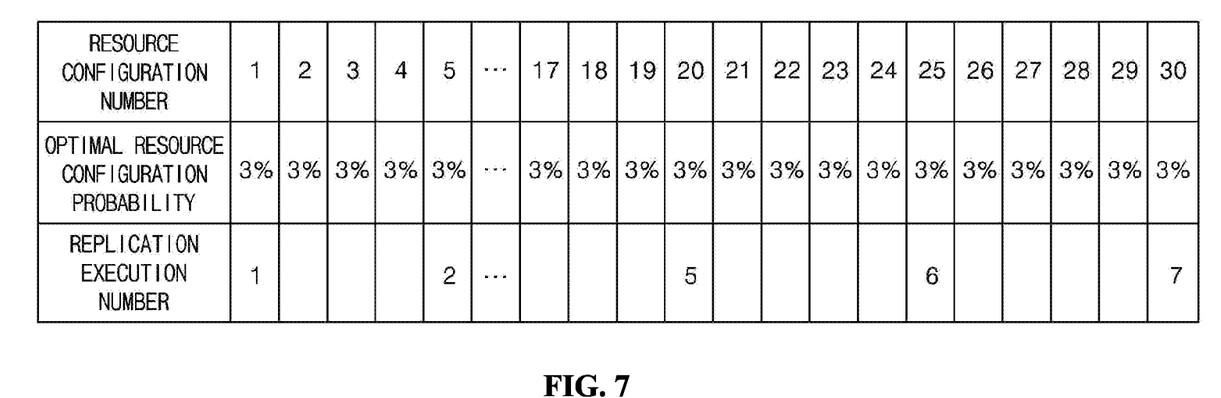
FIG. 7 is a diagram exemplarily illustrating a probability distribution when there is no simulation history.

FIG. 7 is a diagram exemplarily illustrating a probability distribution when there is no simulation history. Referring to FIG. 7, when there is no history of the corresponding simulation, probabilities may be uniformly distributed with respect to settings presented by the user. For example, the probability distribution may be designated so that a probability of 3%, as the optimal resource configuration probability, is uniformly set for the cases where the number of virtual nodes is 2, 4, 6, 8, . . . , 32.

Thereafter, the simulation apparatus 100 may replicate the corresponding simulation to multiple simulations by selecting resource configurations for N simulation environments (i.e., by designating replication execution numbers) depending on the probability distribution of the optimal resource configuration at step S130. Here, N may be a value designated by the system, a value designated by the user, or a value matching the virtual resource usage budget of the user, etc.

The simulation apparatus 100 may separate a process for the allocation of virtual resource nodes and for the execution of simulations into N procedures based on selected replication execution numbers, and may simultaneously perform the N procedures at step S140. Step S140 may be performed as follows.

The simulation apparatus 100 may check each individual simulation resource configuration, and may allocate and create required virtual nodes at step S141. Further, at step S141, the simulation apparatus 100 may allocate cloud resources for operating the virtual nodes to internal resource nodes or resource nodes of an external cloud at step S141.

The simulation apparatus 100 may control workloads such that additional external workloads are not combined with the performance of virtual nodes in the simulation environments. When allocating resources of virtual nodes to cloud resource nodes, the simulation apparatus 100 may lead the execution of simulations to a scheme in which a resource node which is not currently performing an external workload is selected, in which an external workload currently operating in a resource node is terminated if necessary, or in which the corresponding workload migrates to another resource node to perform only a workload related to the simulation. The simulation apparatus 100 may configure a simulation cluster using the created virtual nodes, configure an engine and execution environment related to simulations in the simulation cluster, and execute the simulation requested by the user at step S142.

Thereafter, whether the simulation has been completed may be determined at step S143. In an embodiment, the simulation apparatus 100 may monitor the status of execution of the simulation until the end time of the simulation. For example, the status of simulation execution may be monitored using various schemes, such as a push or polling method.

When the simulation is completed, the simulation apparatus 100 may store information about a simulation completion time at step S144. When the simulation is completed, the simulation apparatus 100 may store information about the simulation completion time and proceed to a subsequent step so as to aggregate results including the results of simulation execution, and resource configuration and setup information for the simulation execution environment.

In contrast, if it is determined that the simulation is not completed, whether simulation error or failure has occurred may be determined at step S145. If it is determined that simulation error or failure has not occurred, the process may proceed to step S143. In contrast, if simulation error or failure has occurred, the simulation apparatus 100 may store the status of simulation failure at step S146. When the simulation error has occurred or has failed, the simulation apparatus 100 may store the status of the simulation failure and proceed to a subsequent step to aggregate information.

Next, the simulation apparatus 100 may aggregate pieces of individual information whenever each individual simulation is terminated, and may then configure all simulation results of multiple simulations at step S150. The results of the terminated simulations may be stored in a simulation execution result history.

Then, whether there is a completed simulation may be determined at step S160. This is intended to determine whether there is a simulation that has been completed the earliest.

If it is determined that there is the completed simulation, the simulation apparatus 100 may terminate the remaining simulations and simulation execution environments and then promptly release the used cloud resources at step S170 because the completed simulation is the earliest-completed simulation. Thereafter, notification of the results of the earliest-completed simulation may be provided to the user at step S190.

In contrast, if it is determined that there is no completed simulation, whether all of N simulations have failed may be determined at step S180. If all of N simulations have not failed, the process may proceed to step S150. In contrast, if it is determined that all of N simulations have failed, notification of simulation failure may be provided to the user at step S190.

In accordance with an embodiment, some or all of steps and/or operations may be at least partially implemented or executed using instructions, programs and interactive data structures stored in one or more non-transitory computer-readable storage media, and one or more processors for driving clients and/or servers. Examples of computer-readable storage media may include all types of hardware devices specially configured to record and execute program instructions, such as magnetic media, such as a hard disk, a floppy disk, and magnetic tape, optical media, such as compact disk (CD)-read only memory (ROM) and a digital versatile disk (DVD), magneto-optical media, such as a floptical disk, a Solid State Drive (SSD), ROM, random access memory (RAM), and flash memory. The one or more non-transitory computer-readable storage media may be, for example, software, firmware, or hardware, and/or any combination thereof. Also, the function of the term "module" discussed in the present specification may be implemented using software, firmware, hardware and/or combinations thereof.

The one or more non-transitory computer-readable storage media and/or means for implementing/executing one or more operations/steps/modules according to embodiments of the present invention may include, but are not limited to, Application-Specific Integrated Circuits (ASICs), standard Integrated Circuits, controllers which include a microcontroller and execute suitable commands, and/or embedded controllers, Field-Programmable Gate Arrays (FPGAs), Complex Programmable Logic Devices (CPLDs), etc.

Below, a process for replicating a simulation environment configuration to multiple configurations and optimizing resource configurations will be described in detail.

The virtual resource configuration for a simulation environment may be implemented using various components. The resource components may include the number of virtual nodes that constitute a simulation cluster, resource performance (CPU, memory, or network bandwidth), information about whether a virtual node supports a specific function, etc.

Figure 8:
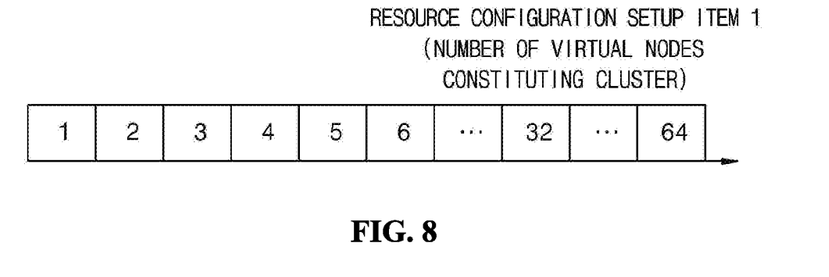
FIG. 8 is a diagram exemplarily illustrating a selectable resource configuration list when only a single resource configuration setup item is established.

FIG. 8 is a diagram exemplarily illustrating a selectable resource configuration list when only a single resource configuration setup item is established. Referring to FIG. 8, when only a single resource configuration setup item is used, the selectable resource configuration list may be sequentially designated as a one-dimensional (1D) array.

Figure 9:
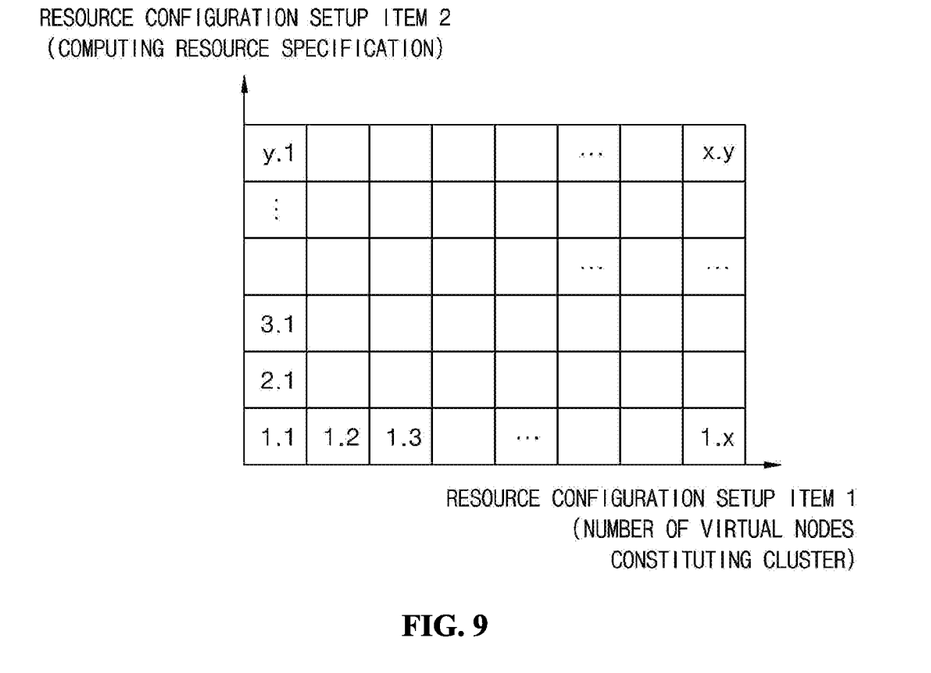
FIG. 9 is a diagram exemplarily illustrating a selectable resource configuration list when two resource configuration setup items are established.

FIG. 9 is a diagram illustrating a selectable resource configuration list when two resource configuration setup items are established. Referring to FIG. 9, when two resource configuration setup items are used, the selectable resource configuration list may be sequentially designated as a two-dimensional (2D) array. Similarly, when the number of resource configuration setup items is large, a selectable resource configuration list may be defined as a multi-dimensional array.

Further, a method for calculating the probability distribution of an optimal resource configuration is described below.

Figure 10:
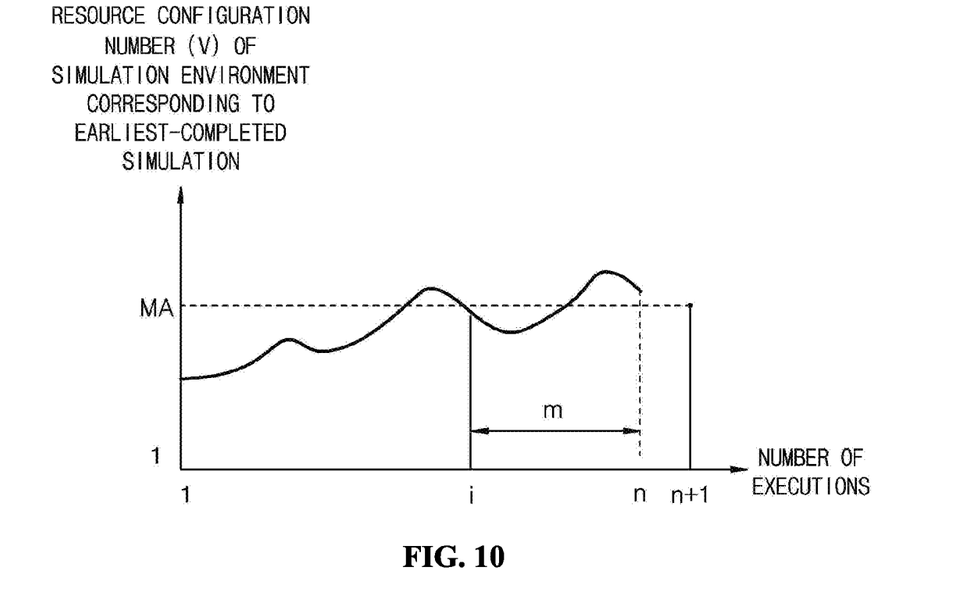
FIG. 10 is a diagram exemplarily illustrating the history of a resource configuration in a simulation environment corresponding to the earliest-completed simulation and a moving average calculation section.

The simulation apparatus 100 may check the resource configuration in a simulation environment corresponding to the earliest-completed simulation for each simulation type from a past transaction history. The simulation apparatus 100 may calculate a moving average (MA) of the resource configuration number in the simulation environment corresponding to the earliest-completed simulation for m transaction sections (i to n). MA may be calculated using Equation (1).

Also, the simulation apparatus 100 may calculate a moving variance MSTD$^2$ for m transaction sections i to n. MSTD$^2$ may be calculated using Equation (2):

FIG. 10 is a diagram exemplarily illustrating the history of a resource configuration in a simulation environment corresponding to the earliest-completed simulation and a moving average calculation section.

Figure 11:
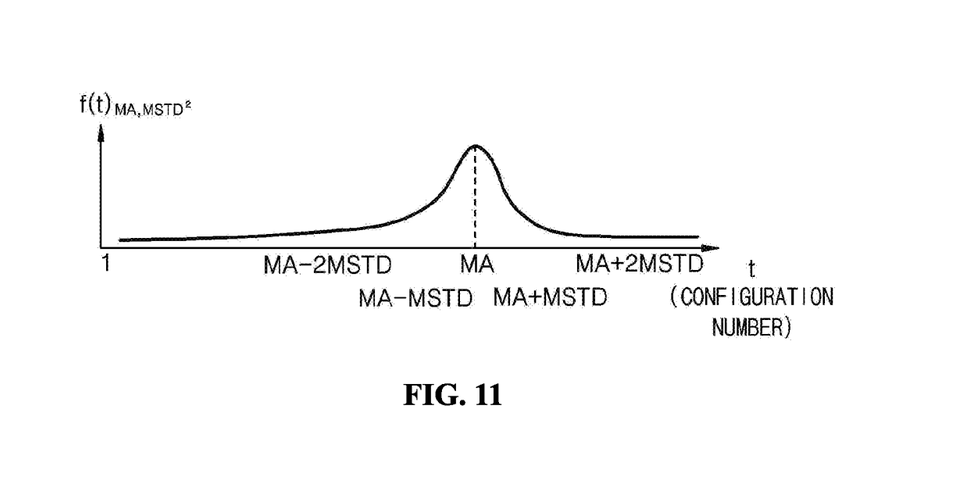
FIG. 11 is a diagram exemplarily illustrating a probability distribution graph of an optimal simulation resource configuration conforming to a probability distribution of $N(MA, MSTD^2)$.

A typical normal probability distribution conforming to N(μ, σ$^2$) may be defined by the following Equation (3):

$$N(\mu, \sigma^2) = f(x)_{\mu,\sigma^2} = \frac{1}{\sqrt{2\pi\sigma^2}} e^{\frac{-(x-\mu)^2}{2\sigma^2}} \quad (3)$$

Assuming that MA is a moving average of the resource configuration number of the simulation environment corresponding to the earliest-completed simulation, and MSTD$^2$ is a variance of the resource configuration number of the simulation environment corresponding to the earliest-completed simulation, the resource configuration probability distribution of an optimal simulation may be defined by the normal probability distribution conforming to N(MA, MSTD$^2$), as represented by the following Equation (4):

$$N(MA, MSTD^2) = f(t)_{MA,MSTD^2} = \frac{1}{\sqrt{2\pi \cdot MSTD^2}} e^{\frac{-(t-MA)^2}{2 \cdot MSTD^2}} \quad (4)$$

FIG. 11 is a diagram exemplarily illustrating a probability distribution graph for an optimal simulation resource configuration probability conforming to a probability distribution of N(MA, MSTD$^2$). Referring to FIG. 11, it can be seen that a higher probability is distributed in the direction closer to a moving average MA, and a lower probability is distributed in the direction farther away from MA.

In a typical simulation execution scheme using a cloud, a user arbitrarily selects the configuration of computing resources for a simulation and then executes the simulation. Such a simulation is a task that requires a considerably long time for execution. When the configuration of designated resources is not suitable, the simulation execution speed may be remarkably decreased. Further, when the performance, capacity, type, etc. of resources required by the simulation are erroneously configured, errors may occur before completion of a simulation that is executed for a long period of time. In this case, a simulation user may waste his or her time as well as costs of computing resources.

In the present invention, simulation users dynamically configure optimal cloud computing resources suitable for various simulations. There is provided a method for replicating the configuration of virtual resources for executing a simulation to multiple simulations (i.e., replication of a simulation execution environment) and simultaneously bursting and executing the simulations. Since simulations having various configurations are simultaneously operated, the user needs only to check the results of a simulation that has been successfully completed the earliest, among simulation execution environments. Consequently, an optimal simulation environment is provided to the user. When optimal cloud computing resources suitable for various simulations are dynamically configured, the decrease in simulation speed and the occurrence of simulation failure may be reduced.

The present invention includes a method for limitedly using a large number of virtual resources by limiting the number of virtual resources (virtual nodes) to be used depending on costs. By means of the present invention, when users repeatedly configure and execute various heterogeneous simulations, there is proposed a method for profiling various heterogeneous simulations and selecting an efficient optimal resource configuration based on statistics and probability by utilizing history information of simulation environment configurations which were successful in past.

In the cloud computing-based simulation apparatus and the method for operating the simulation apparatus according to the embodiment of the present invention, simulation users may dynamically configure optimal cloud computing resources suitable for various simulations, and may replicate the configuration of virtual resources for executing a simulation to multiple simulations (i.e., replication of a simulation execution environment), thus simultaneously bursting and executing the simulations.

In the cloud computing-based simulation apparatus and the method for operating the simulation apparatus according to the embodiment of the present invention, since simulations having various configurations are simultaneously operated, the user may check only the results of a simulation that has been successfully completed the earliest, among simulation execution environments. Consequently, an optimal simulation environment is provided to the user.

In the cloud computing-based simulation apparatus and the method for operating the simulation apparatus according to the embodiment of the present invention, when optimal cloud computing resources suitable for various simulations are dynamically configured, the decrease in simulation speed and the occurrence of simulation failure may be reduced.

In the cloud computing-based simulation apparatus and the method for operating the simulation apparatus according to the embodiment of the present invention, a large number of virtual resources may be limitedly used by limiting the number of virtual resources (virtual nodes) to be used depending on costs.

In the cloud computing-based simulation apparatus and the method for operating the simulation apparatus according to the embodiment of the present invention, when users repeatedly configure and execute various heterogeneous simulations, various heterogeneous simulations may be profiled, and an efficient optimal resource configuration may be selected based on statistics and probability by utilizing history information of simulation environment configurations which were successful in past.

Meanwhile, the descriptions of the present invention are only detailed embodiments for practicing the present invention. The present invention may encompass not only detailed and actually available means but also the technical spirit indicating abstract and conceptual ideas that can be utilized as technology in the future.

What is claimed is:

1. A method for operating a cloud computing-based simulation apparatus, comprising:

profiling a simulation in consideration of a simulation model and setup items that are requested by a user;

when there is a history corresponding to results of the profiled simulation, calculating a resource configuration probability distribution for the simulation using the history;

replicating the simulation environment to multiple simulation environments by selecting resource configurations in N simulation environments depending on the resource configuration probability distribution, where N is an integer of 2 or more; and simultaneously executing simulations in the multiple simulation environments, wherein the results of the profiled simulation are information about a resource configuration and setup that provided the fastest performance for each simulation type, wherein calculating the resource configuration probability distribution comprises:

when there is the history, calculating a moving average of multiple sections of the history;

calculating a moving variance of the multiple sections; and generating a resource configuration probability table by calculating a normal probability distribution based on the moving average and the moving variance, wherein the resource configuration probability table comprises replication execution numbers, and wherein selecting the resource configurations in the N simulation environments is designating the replication execution numbers.

2. The method of claim 1, further comprising, when there is no history corresponding to the profiled simulation results, uniformly calculating the resource configuration probability distribution based on the user's settings.

3. The method of claim 1, wherein N is set to any one of a value designated by a system, a value designated by the user, and a value corresponding to virtual resource usage budget of the user.

4. The method of claim 1, wherein simultaneously executing the simulations comprises:

checking resource configurations in individual simulation environments and allocating virtual nodes to the resource configurations;

configuring a simulation cluster from the allocated virtual nodes; and executing the corresponding simulation on the configured simulation cluster.

5. The method of claim 4, further comprising monitoring a status of the simulations executed in the multiple simulation environments.

6. The method of claim 5, further comprising, when the simulation is completed in any one of the multiple simulation environments as a result of the monitoring, storing a completion time of the simulation, and updating results of execution of the simulation and the information about the resource configuration and the setup in the corresponding simulation environment in the history.

7. The method of claim 6, further comprising, when the simulation is completed in any one of the multiple simulation environments as a result of the monitoring, terminating execution of simulations in remaining simulation environments.

8. The method of claim 5, further comprising, when all simulations in the multiple simulation environments have failed as a result of the monitoring, providing notification of simulation failure to the user.

9. A cloud computing-based simulation apparatus, comprising:

at least one processor; and a memory for storing at least one instruction executed by the at least one processor, the at least one instruction being configured to:

profile a simulation in consideration of a simulation model and setup items that are requested by a user, when there is a history corresponding to results of the profiled simulation, calculate a resource configuration probability distribution for the simulation using the history, replicate the simulation environment to multiple simulation environments by selecting resource configurations in N simulation environments depending on the resource configuration probability distribution, where N is an integer of 2 or more, and simultaneously execute simulations in the multiple simulation environments, wherein the results of the profiled simulation are information about a resource configuration and setup that provided the fastest performance for each simulation type, wherein the at least one instruction is further configured to:

when there is the history, calculate a moving average of multiple sections of the history, calculate a moving variance of the multiple sections, generate a resource configuration probability table by calculating a normal probability distribution based on the moving average and the moving variance, wherein the resource configuration probability table comprises replication execution numbers, and wherein selecting the resource configurations in the N simulation environments is designating the replication execution numbers.

10. The cloud computing-based simulation apparatus of claim 9, wherein the multiple simulation environments are configured using different numbers of virtual nodes.

11. The cloud computing-based simulation apparatus of claim 9, wherein, when a simulation is completed in any one of the multiple simulation environments, simulations in remaining simulation environments are terminated, and cloud resources used in the remaining simulation environments are released.

12. The cloud computing-based simulation apparatus of claim 11, wherein a status of the simulations executed in the multiple simulation environments is monitored using a push method or a polling method.

13. The cloud computing-based simulation apparatus of claim 12, wherein results of multiple simulations are aggregated and stored through monitoring of the status of the simulations.

\* \* \* \* \*